United States Patent
Blander et al.

(10) Patent No.: US 9,112,901 B2
(45) Date of Patent: Aug. 18, 2015

(54) METHOD AND SYSTEM FOR PROVIDING CONNECTION RESILIENCY

(75) Inventors: Emanuel Blander, Noridiya (IL); Amir Peles, Tel Aviv (IL)

(73) Assignee: Radware, Ltd., Tel Aviv (IL)

(*) Notice: Subject to any disclaimer, the term of this patent is extended or adjusted under 35 U.S.C. 154(b) by 1225 days.

(21) Appl. No.: 11/943,513

(22) Filed: Nov. 20, 2007

(65) Prior Publication Data

US 2009/0132714 A1   May 21, 2009

(51) Int. Cl.
*H04L 29/06* (2006.01)
*H04L 29/14* (2006.01)

(52) U.S. Cl.
CPC ........... *H04L 69/16* (2013.01); *H04L 69/165* (2013.01); *H04L 69/40* (2013.01)

(58) Field of Classification Search
CPC ....................................................... H04L 69/16
USPC ............................................................ 709/227
See application file for complete search history.

(56) References Cited

U.S. PATENT DOCUMENTS

| | | | | |
|---|---|---|---|---|
| 6,003,084 A * | 12/1999 | Green et al. | .................. | 709/227 |
| 6,332,163 B1 * | 12/2001 | Bowman-Amuah | .......... | 709/231 |
| 6,687,245 B2 * | 2/2004 | Fangman et al. | ............. | 370/356 |
| 6,775,692 B1 * | 8/2004 | Albert et al. | .................. | 709/207 |
| 6,842,906 B1 * | 1/2005 | Bowman-Amuah | .......... | 719/330 |
| 6,894,981 B1 * | 5/2005 | Coile et al. | ..................... | 370/248 |
| 7,003,572 B1 * | 2/2006 | Lownsbrough et al. | ...... | 709/227 |
| 7,016,973 B1 * | 3/2006 | Sibal et al. | ..................... | 709/238 |
| 7,212,492 B1 * | 5/2007 | Au et al. | ........................ | 370/229 |
| 7,469,279 B1 * | 12/2008 | Stamler et al. | ................ | 709/221 |
| 7,620,734 B2 * | 11/2009 | Freudenthal | .................. | 709/246 |
| 7,650,427 B1 * | 1/2010 | Liu et al. | ........................ | 709/238 |
| 7,698,458 B1 * | 4/2010 | Liu et al. | ........................ | 709/238 |
| 8,331,229 B1 * | 12/2012 | Hu et al. | ........................ | 370/230 |
| 2002/0087861 A1 * | 7/2002 | Segev et al. | .................... | 713/168 |
| 2002/0188870 A1 * | 12/2002 | Gong et al. | .................... | 713/201 |
| 2003/0137960 A1 * | 7/2003 | Greis | ............................... | 370/338 |
| 2004/0062267 A1 * | 4/2004 | Minami et al. | ................ | 370/463 |
| 2004/0268175 A1 * | 12/2004 | Koch et al. | ........................ | 714/4 |
| 2006/0047839 A1 * | 3/2006 | Tate et al. | ...................... | 709/230 |
| 2008/0069149 A1 * | 3/2008 | Poulin et al. | .................... | 370/503 |
| 2008/0082669 A1 * | 4/2008 | Williams et al. | .............. | 709/227 |
| 2008/0144644 A1 * | 6/2008 | Allan et al. | ..................... | 370/401 |
| 2009/0154356 A1 * | 6/2009 | Wiemann et al. | ............. | 370/236 |

* cited by examiner

*Primary Examiner* — Ondrej C. Vostal
(74) *Attorney, Agent, or Firm* — M&B IP Analysts, LLC

(57) ABSTRACT

A system, method and device for providing connection resiliency. The method including maintaining, by a first proxy, a TCP connection with a TCP client and a TCP connection with a TCP server through one or more TCP networks; maintaining information of both TCP connections by a forwarding component between the TCP networks and the first proxy; establishing, by the forwarding component, a new TCP connection with a second proxy for each of the TCP connections maintained by the first proxy; and forwarding data, to and from both the client and the server, to and from the second proxy without disconnection of the TCP connections of the TCP client and TCP server.

26 Claims, 10 Drawing Sheets

METHOD AND SYSTEM FOR PROVIDING CONNECTION RESILIENCY

FIELD OF THE INVENTION

The present invention relates in general to proxy servers, and more particularly to providing connection resiliency in proxy servers.

BACKGROUND

A Transmission Control Protocol (TCP) proxy server acts as an intermediary between two parties, called a client and a server. The TCP proxy server forwards the data received from one or more clients to one or more servers. Similarly, it forwards the data received from one or more servers to one or more clients. It may also modify the data before forwarding it to a server or a client. The modification may include one or more of data filtering, data encryption and decryption, data compression and decompression, data authentication, data securing, and data formatting. Other functionalities of a TCP proxy server include data caching, TCP splitting and TCP multiplexing.

In order to provide reliable communication of data between a client and a server, the TCP proxy server must perform its task in a consistent manner. However, the communication between the client and the server may suffer due to occasional failure of the TCP proxy server. In order to overcome this problem TCP proxy servers are employed in pairs where one of the servers remains active and actually performs the tasks of the TCP proxy server and the other acts as a backup. In case the active server fails, the backup server takes over the tasks of the active server.

In order to implement the takeover, information related to the current states of the existing TCP connections is required. The information includes, without limitation, the sequence and acknowledgement numbers of the data packets transmitted or received by the TCP proxy server, and buffered data to be transmitted or received by the TCP proxy server. In accordance with some methods, this information is acquired periodically. However, the information is updated with every data packet transmitted or received by the TCP proxy server. Therefore, in order to implement a fully reliable takeover, the information must be acquired with every transmitted/received data packet. The process of acquiring the information with every transmitted/received packet is very costly. Therefore, most of the methods make a compromise with either the reliability or the immediacy of the takeover or the performance capacity of the proxy.

Some other methods for takeover duplicate each data packet and forward each data packet to both the active server and the backup server, so that both servers are aware of the current states of the TCP connections. Thereafter, the active server processes the data packets while the backup server discards them. However, this method of takeover is highly inefficient and puts additional burden of duplicating and forwarding to the backup server.

So, there is a need for an efficient proxy system that provides a reliable communication of data between a client and a server.

SUMMARY

In an embodiment of the present invention, a connection resilient proxy system is provided. The system includes a connection resilient proxy system communicating with at least one client and one server through at least one transmission control protocol (TCP) network external to the proxy system. The proxy system includes at least one active proxy managing a separate TCP connection with each of the client and the server and determining a destination for received data, wherein the destination includes one of the client and the server; at least one backup proxy for determining the destination for received data in an event of predetermined conditions; and at least one active forwarding component for routing data between the at least one TCP network and the active proxy, wherein the active forwarding component maintains information of the TCP connections between the TCP networks and the active proxy. In the event of a predetermined condition, the active forwarding component modifying received data according to the maintained information and forwarding the received data to the backup proxy or the TCP network, thereby forwarding data, to and from both the client and the server, to and from the backup proxy without disconnection of the TCP connections of the client and server.

In another embodiment of the present invention, a method for providing connection resiliency is also provided. The method includes maintaining the information of all the connections of an active forwarding component with at least one of a TCP network, an active proxy component and a backup proxy component and monitoring the active proxy component. The method further includes establishing a new connection with the backup proxy component for each corresponding connection with the active proxy component in case of failure of the active proxy component and routing data packets between the TCP network and the backup proxy component upon establishment of each new connection.

In yet another embodiment of the present invention, a connection resilient proxy system communicating with at least one client and one server through a TCP) network external to the proxy system is provided. The proxy system includes at least one active proxy component for determining a destination of received data packet. The destination comprises one of the client and the server. The active proxy component further manages a separate TCP connection with both the client and the server. The system also includes at least one backup proxy component for determining the destination for received data packet in an event the active proxy component fails. The system also includes at least one active forwarding component for routing data packets between the TCP network and one of the active proxy component and the backup proxy component. The active forwarding component resides on a device separate from the active proxy component and maintains information of all the TCP connections between the TCP network and either the active proxy component or the backup proxy component. Further, the active forwarding component establishes a new TCP connection with the backup proxy component for a corresponding TCP connection with the active proxy component in case of the failure of the active proxy component. Additionally, the active forwarding component modifies a data packet sequence number and a data packet acknowledgement number using the maintained information while routing the data packets between the TCP network and the backup proxy component.

In yet another embodiment of the present invention a forwarding device routing data packets between transmission control protocol networks and a first proxy, includes a processing unit for maintaining information of TCP connections between the TCP networks and the first proxy, and in the event of a predetermined condition, modifying received data according to said maintained information and forwarding said received data to a second proxy or said TCP network, thereby forwarding data, to and from both a client and a server, to and from the second proxy without disconnection of TCP connections of the client and server maintained by the first proxy prior to said predetermined condition event.

DETAILED DESCRIPTION

Figure 1:
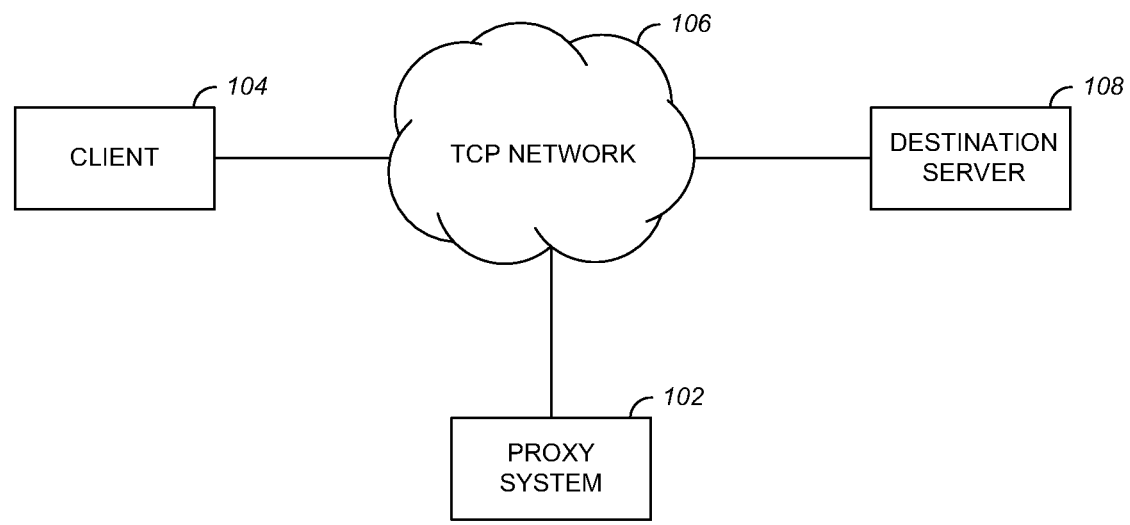
FIG. 1 illustrates an exemplary overview of the deployment of a proxy system.

FIG. 1 illustrates an exemplary overview 100 of the deployment of a proxy system 102. The overview 100 includes at least one client 104, a TCP network 106, and at least one server 108. The proxy system 102 is in communication with both the client 104 and the server 108 through the TCP network 106. Since the TCP network 106 is external to the proxy system 102, hereinafter, it is referred to as external TCP network 106. The external TCP network 106 may be any network supporting TCP such as a personal area network (PAN), a local area network (LAN), a wide area network (WAN), a campus area network (CAN), or a metropolitan area network (MAN). The external TCP network 106 may also be a combination of more than one type of network, for example, it may be a combination of a LAN and a WAN. The external TCP network 106 may also include one or more network nodes between the client 104 and the proxy system 102 or the server 108 and the proxy system 102, for example, there may be a router or a gateway for routing data packets between the client 104 and the proxy system 102.

The client 104 may be a content requester by sending a request to the proxy system 102 through the external TCP network 106. The request may be a webpage request, a download request, a SIP request, a Diameter request, a LDAP request or a request for any other service. The client 104 may also send content to the proxy system 102, for example, to upload content to the proxy system 102.

The server 108 may be a content provider, for example, a web server hosting various content, a SIP server, a Diameter server, a LDAP server or any other server. The server 108 receives a request for content from the proxy system 102 and provides the content to the proxy system 102. The server 108 may also receive content from the proxy system 102, for example, to upload the content.

The proxy system 102 acts as an intermediary between the client 104 and the server 108. The proxy system 102 receives data packets from the client 104 and forwards them to the server 108. Similarly, it receives data packets from the server 108 and forwards them to the client 104. The proxy system 102 may also modify the data before forwarding it to the server 108 or the client 104. The modification may include one or more of data filtering, data blocking, data encryption and decryption, data compression and decompression, and data formatting. The proxy system 102 may also perform one or more of authenticating and securing the data. The proxy system 102 may also cache data for providing quick access to the client 104. The proxy system 102 may also perform TCP splitting, that is, forwarding the data arriving from a single client over a single TCP channel to multiple servers over multiple TCP channels, and TCP multiplexing, that is, forwarding the data arriving from a single server over a single TCP channel to multiple clients over multiple TCP channels. The proxy system 102 may also distribute the requests from one or more clients among a plurality of servers in order to achieve a desired distribution of load among the servers.

The proxy system 102 is a connection resilient proxy system comprising at least one active forwarding component, at least one active proxy component and at least one backup proxy component. An exemplary connection resilient proxy system 102 is described below in accordance with FIG. 2.

Figure 2:
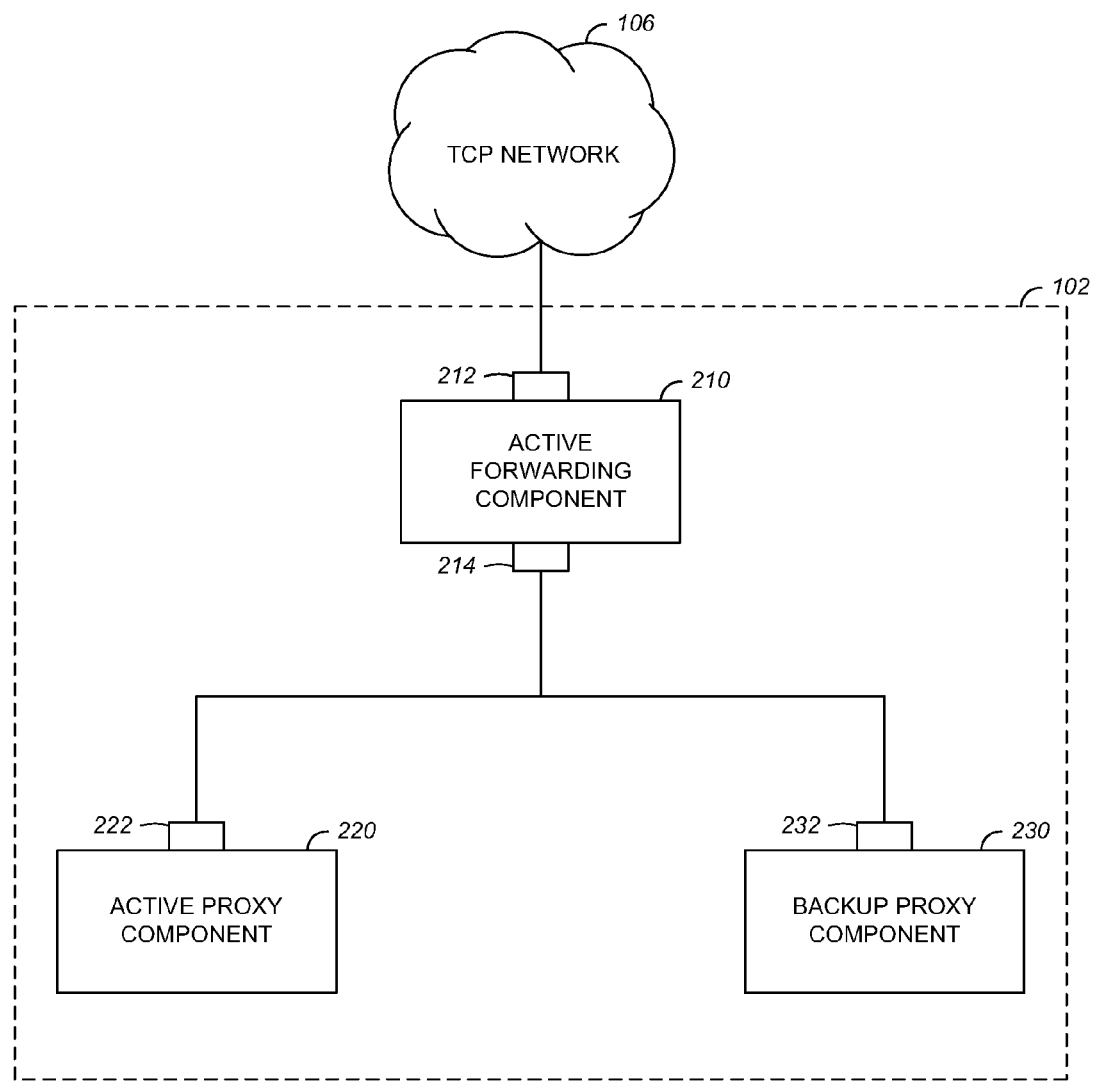
FIG. 2 illustrates components of an exemplary connection resilient proxy system.

FIG. 2 illustrates components of an exemplary connection resilient proxy system 102. Hereinafter, the connection resilient proxy system is referred to as the proxy system. The proxy system 102 comprises at least one active forwarding component 210, at least one active proxy component 220, and at least one backup proxy component 230. The active forwarding component 210 comprises at least one external IP interface 212 for communicating with the client 104 and the server 108 via the external TCP network 106. The active forwarding component 210 further comprises at least one internal IP interface 214 for communicating with the active proxy component 220 or the backup proxy component 230 in case of the failure of the active proxy component 220. The internal IP interface 214 may be separate from the external IP interface 212 if the network between the active forwarding component 210 and the active proxy component 220 is a separate internal LAN. In an alternate embodiment of the present invention, there may be a single external and internal IP interface.

The active proxy component 220 includes at least one active proxy IP interface 222 for communicating with the active forwarding component 210. Each active proxy IP interface corresponds to an external IP interface. The backup proxy component 230 includes at least one backup proxy IP interface 232 for communicating with the active forwarding component 210. Each backup proxy IP interface corresponds to an external IP interface. The active proxy component 220 and the backup proxy component 230 may be connected to the active forwarding component 210 either directly or through a network, for example, a LAN. Although the active forwarding component 210 and the proxy components 220 & 230 are shown as separate components in FIG. 2, an active forwarding component may reside on a single physical device with a proxy component. Or each proxy component may include a forwarding component.

The active forwarding component 210 makes a separate internal connection with the active proxy component 220 corresponding to each connection with the external TCP network 106. The active forwarding component 210 receives data packets from the external TCP network 106 and forwards the received data packets using the corresponding internal connection to the active proxy component 220. The active forwarding component 210 uses the internal IP interface 214 to forward the data packets to the active proxy component 220. Similarly, it receives data packets from the active proxy component 220 and forwards the received data packets to the corresponding connection with the external TCP network 106.

The active forwarding component 210 maintains the information of all the TCP connections between the external TCP network 106 and either the active proxy component 220 or the backup proxy component 230. The information includes at least one of highest data packet sequence number, highest data packet acknowledgement number, a source IP address, a destination IP address, a source port number, a destination port number, a sequence number delta, an acknowledgement number delta, and internal connection information. The active forwarding component 210 saves the information whenever it either receives a data packet from the external TCP network 106 or forwards a data packet to the external TCP network 106. For example, every time the active forwarding component 210 receives a data packet from the client 104 or the server 108, it saves the data packet sequence and the data packet acknowledgement numbers, if they are the highest so far received on that connection. Similarly, when the active forwarding component 210 receives a data packet from the active proxy component 220 that is to be forwarded to the client 104 or the server 108, the active forwarding component 210 saves the data packet sequence and the data packet acknowledgement numbers of the transmitted data packet, if they are the highest so far transmitted on that same connection. Thus, for each connection with TCP network 106, the active forwarding component 210 maintains, at any given point in time, the highest data packet sequence number and the highest data packet acknowledgement number either received from or sent to the external TCP network 106.

The highest data packet sequence number is calculated from the sequence numbers of data packets received from the TCP network 106 and acknowledgement numbers of data packets transmitted to the TCP network 106.

The highest data packet acknowledgement number is calculated from the acknowledgement numbers of data packets received from the TCP network 106 and sequence numbers of data packets transmitted to the TCP network 106.

The active forwarding component 210 may perform one of network address translation or network address port translation on the data packets in order to forward the data packets to their required destinations. Network address translation may include changing one or more of a source IP address, a destination IP addresses, while the network address port translation may include changing one or more of a source TCP port, and a destination TCP port of the data packets.

The active forwarding component 210 monitors the active proxy component 220. The monitoring may be performed in order to determine an imminent failure of the active proxy component 220 or a capacity of the active proxy component 220 to handle communications. Thus, the health of the active proxy component 220 may be estimated by performing network connectivity checks. Non-limiting examples include sending a ping request and expecting a ping response; or performing application connectivity checks, for example, sending an application request and expecting an application response. Alternatively, the health may be estimated by monitoring the time the active proxy component 220 takes to respond to a request.

In case there is a failure of the active proxy component 220 or it is overloaded, the active forwarding component 210 establishes, for each internal connection with the active proxy component 220, a new internal connection with the backup proxy component 230, that is, it moves the internal connections with the active proxy component 220 to the backup proxy component 230. Establishing the new internal connection may include TCP handshake between the active forwarding component 210 and the backup proxy component 230. The TCP handshakes are performed for each TCP connection that was maintained by the active proxy component 220. TCP handshake process includes exchange of synchronization packets between the active forwarding component 210 and the backup proxy component 230. Further, the new connection has the port numbers and IP addresses correlating to the old connection.

Once the connection (s) with the backup proxy component 230 is established the active forwarding component 210 routes the data packets received from the external TCP network 106 to the backup proxy component 230 and vice versa. Before routing the data packets to the backup proxy component 230 or external TCP network 106, the active forwarding component 210 may modify the data packets based upon the maintained information of the prior TCP connections between the external TCP network 106 and the prior active proxy component 220. For example, for data packets received from the external TCP network 106, the active forwarding component 210 may modify one or more of the data packet sequence number and data packet acknowledgement number by a sequence number delta and an acknowledgement number delta of the corresponding internal connection respectively before forwarding the data packets.

The sequence number delta is the difference between the highest data packet sequence number and the data packet acknowledgement number received by the active forwarding component from the backup proxy component during TCP connection establishment.

The acknowledgement number delta is the difference between the highest data packet acknowledgement number and the data packet acknowledgement number sent to the backup proxy component from the active forwarding component during TCP connection establishment of the related front end connection.

For data packets transmitted to the external TCP network 106, the active forwarding component 210 may also modify one or more of the data packet sequence number and data packet acknowledgement number by a back end sequence number delta and a back end acknowledgement number delta of the corresponding internal connection after receiving the data packets from the backup proxy component 230.

The back end sequence number delta is the difference between the highest data packet acknowledgement number sent to the active proxy component from the active forwarding component and the highest data packet acknowledgement number sent to the backup proxy component from the active forwarding component while the back end acknowledgement number delta is the difference between the highest data packet acknowledgement number received by the active forwarding component from the active proxy component and the highest data packet acknowledgement number received by the active forwarding component from the backup proxy component.

The data packet sequence number and data packet acknowledgement number is modified to conform the communication between the active forwarding component 210 and the backup proxy component 230 to the communication between the active forwarding component 210 and the external TCP network 106.

Once the connection (s) with the backup proxy component 230 is established, the active forwarding component 210 may perform the same or similar functions as it performed while communicating with the active proxy component 220. In an event the backup proxy component 230 fails or when the active proxy component 220 has recovered, the active forwarding component 210 may establish new internal connections with the active proxy component 220 in the same way as it established the internal connections with the backup proxy component 230 when the active proxy component 220 failed.

As mentioned above and now discussed in more detail, the active proxy component 220 terminates the TCP connections and builds the data messages from the data packets it receives from the active forwarding component 210. The active proxy component 220 determines the destination (the client 104 or the server 108) for each data message and manages a separate TCP connection with both the client and the server. The active proxy component 220 decides the TCP connection on which the data message should be forwarded based upon the destination and sends the data message through one or more data packets to the determined destination via the active forwarding component 210. Since each internal connection between the active proxy component 220 and the active forwarding component 210 corresponds to an external TCP connection (between the active forwarding component 210 and the external TCP network 106), the active proxy component 220 determines the internal connection corresponding to the external TCP connection via which the data packet should be routed. For example, a data packet is received by the active forwarding component 210 from the client 104 over a TCP connection C1. This data packet is forwarded by the active forwarding component 210 to the active proxy component 220 over an internal connection C11 that corresponds to C1. Now, the active proxy component 220 determines that this data packet should reach the server 108 and accordingly, sends the data packet to the active forwarding component 210 over an internal connection C22 that corresponds to a TCP connection C2 between the active forwarding component 210 and the server 108.

In a scenario where there are multiple clients and multiple servers, determining the destination may include selecting one of multiple servers or multiple clients. For example, in TCP load balancing, requests from one or more clients are distributed among a plurality of servers. In this case, the active proxy component 220 determines which server each request should be forwarded to. The active proxy component 220 may direct the active forwarding component 210 to establish new TCP connections with the determined servers. The active forwarding component 210 establishes a new internal connection with the active proxy component 220 for each new TCP connection to be established with the servers or the client, in case such splitting occurs. Therefore, it may forward the data arriving from a single client over a single TCP channel to multiple servers over multiple TCP channels (TCP splitting) and the data arriving from a single server over a single TCP channel to multiple clients over multiple TCP channels (TCP multiplexing). The active proxy component 220 may also distribute the requests from one or more clients among a plurality of servers in order to achieve a uniform distribution of load among the servers (TCP load balancing).

The active proxy component 220 may also perform one or more of data caching, data filtering, data blocking, data encryption and decryption, data compression and decompression, data authentication, data securing, data formatting, and data modification. The active proxy component 220 may cache some data received from the server 108 in its local storage. The cached data may be forwarded to the client 104 based on a request in order to provide fast access to the data. The active proxy component 220 may also perform various types of data filtering, for example, an anonymity filtering where client's personal data are filtered out. The active proxy component 220 may also block some kind of content such as games, chat rooms, messenger, weapons, racism, offensive material, internet pornography etc, from reaching a client. The active proxy component 220 may also encrypt some data in order to make them secure, for example, encrypting sensitive information such as password, credit card number etc. It may also decrypt an encrypted data. The active proxy component 220 may also perform some authentication in order to prevent unauthorized access to some content. It may also format some content, for example, presenting a webpage in a user customized format. It may modify data by adding headers to the data content or NATing L7 content.

The backup proxy component 230 performs the same or similar functions as the active proxy component 220 when the active proxy component 220 fails.

Various embodiments of the proxy system 102 include dedicated backups that become active only when one or more active proxy components fail, or an active proxy component that acts as a backup for some other active proxy component so that no dedicated backup proxy component is required. For example, there may be two active proxy components each working at or below 50 percent of its capacity. Each of these active proxy components can act as a backup for the other and can takeover the tasks of the other in an event one of these components fail. Similarly, backup forwarding components may be dedicated backups that become active only when one or more active forwarding components fail, or an active forwarding component can also act as a backup for some other active forwarding component.

Figure 3A:
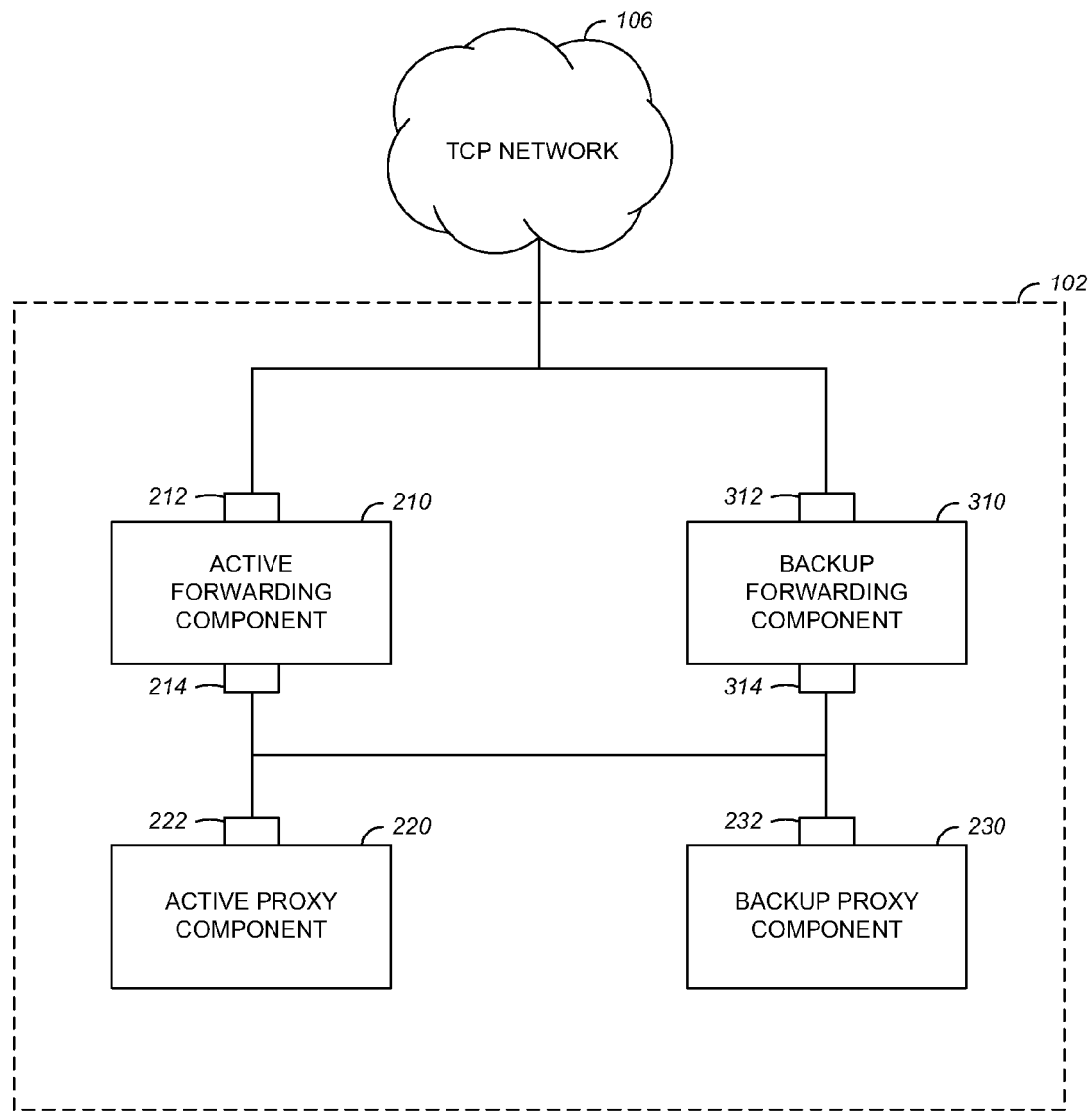
FIG. 3A illustrates components of an exemplary connection resilient proxy system including a backup forwarding component.

FIG. 3A illustrates components of an exemplary proxy system 102 including a backup forwarding component 310. The backup forwarding component 310 comprises at least one external IP interface 312 for communicating with the external TCP network 106 and an internal IP interface 314 for communicating with one of the active proxy component 220 and the backup proxy component 230. The external IP interfaces 312 supports the same IP address as the IP address of the corresponding external IP interface 212 of the active forwarding component 210. The internal IP interfaces 314 supports the same IP address as the IP address of the corresponding internal IP interface 214 of the active forwarding component 210. Each forwarding component backs up the other's IP interfaces, which they manage using a virtual router redundancy protocol (VRRP) or any other redundancy mechanism.

Although only one external IP interface 312 and one internal IP interface 314 for the backup forwarding component 310 are shown in FIG. 3A, it may comprise of a plurality of external and internal IP interfaces. (Also true for 210, 212, 214).

One or more of the active forwarding component 210, the active proxy component 220, the backup proxy component 230, and the backup forwarding component 310 may be connected to each other either directly or through a network, for example, a LAN.

The backup forwarding component 310 periodically checks the status of the active forwarding component 210. Upon detection of a failure of the active forwarding component 210, the backup forwarding component 310 takes over the tasks of the active forwarding component 210. The takeover is managed by the virtual router redundancy protocol. This allows the takeover process to be transparent to the external TCP network 106. For takeover, the backup forwarding component 310 requires the information of all the TCP connections and the internal connections. The backup forwarding component 310 may obtain this information by querying the active proxy component 220 or the backup proxy component 230 depending on which had been communicating with the active forwarding component 210 before the failure or by procuring this information on the fly. Alternatively, this information may be available with the backup forwarding component 310 in case the active forwarding component 210 sends periodic updates to the backup forwarding component 310 before the failure. The active forwarding component 210 may also send updates when a connection is established or terminated. This update may include a source IP, a source port, a destination IP, and a destination port. For each connection, the information comprises at least one of highest data packet sequence number, highest data packet acknowledgement number, a source IP address, a destination IP address, a source port number, a destination port number, a sequence number delta, an acknowledgement number delta, and internal connection information.

While the backup forwarding component 310 takes over the active forwarding component 210, the data packets received from the destination are discarded. Once the takeover is complete, the backup forwarding component 310 receives the data packets from both the external TCP network 106 and the active proxy component 220 (or the backup proxy component 230 in case the active proxy component 220 has failed). The backup forwarding component 310 forwards the data packets received from the external TCP network 106 to the active proxy component 220 (or the backup proxy component 230 in case the active proxy component 220 has failed) and vice-versa. The backup forwarding component uses the sequence number delta and the acknowledgement number delta to modify the sequence and acknowledgement numbers of these data packets.

Although the backup forwarding component 310 has been shown as a separate component in FIG. 3A, it may reside on the same physical device as the active proxy component 220. The active forwarding component 210 and the active proxy component 220 reside on separate physical devices. The active forwarding component 210 and the backup forwarding component 310 reside on separate physical devices. The active proxy component 220 and the backup proxy component 230 reside on separate physical devices. Two exemplary configurations in which the proxy system 102 can be implemented other than the configuration used in FIG. 3A are illustrated in FIG. 3B and FIG. 3C.

Figure 3B:
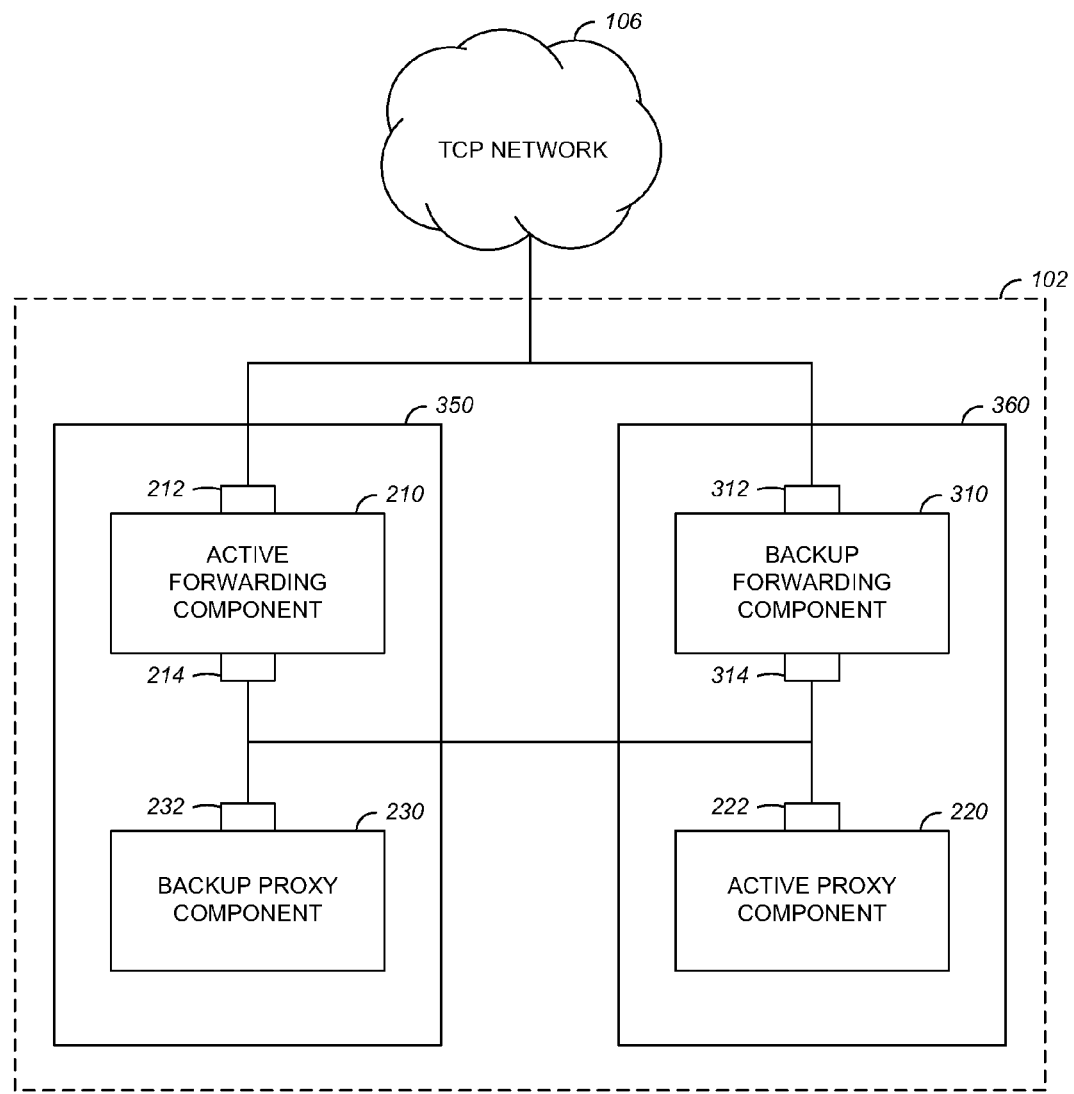
FIG. 3B illustrates an exemplary connection resilient proxy system with an active forwarding component and a backup proxy component residing on a physical device and the active proxy component and the backup forwarding component residing on another physical device.

FIG. 3B illustrates an exemplary connection resilient proxy system 102 with the active forwarding component 210 and the backup proxy component 230 residing on a first physical device 350 and the active proxy component 220 and the backup forwarding component 310 residing on a second physical device 360. In the normal operation, the active forwarding component 210 routes the data packets between the external TCP network 106 and the active proxy component 220. The normal operation refers to the scenario when the active forwarding component 210 and the active proxy component 220 are operating. When the second physical device 360 fails, the active forwarding component 210 routes data packets to the backup proxy component 230 once its connections with the backup proxy component 230 are established. However, once the second physical device 360 recovers from failure, either the active proxy component 220 may takeover the functions of the backup proxy component 230 or the backup forwarding component 310 may takeover the functions of the active forwarding component 210 to ensure smooth functioning of the proxy system 102. This can be implemented by simulating a failure of one of the active forwarding component 210 and the backup proxy component 230.

Figure 3C:
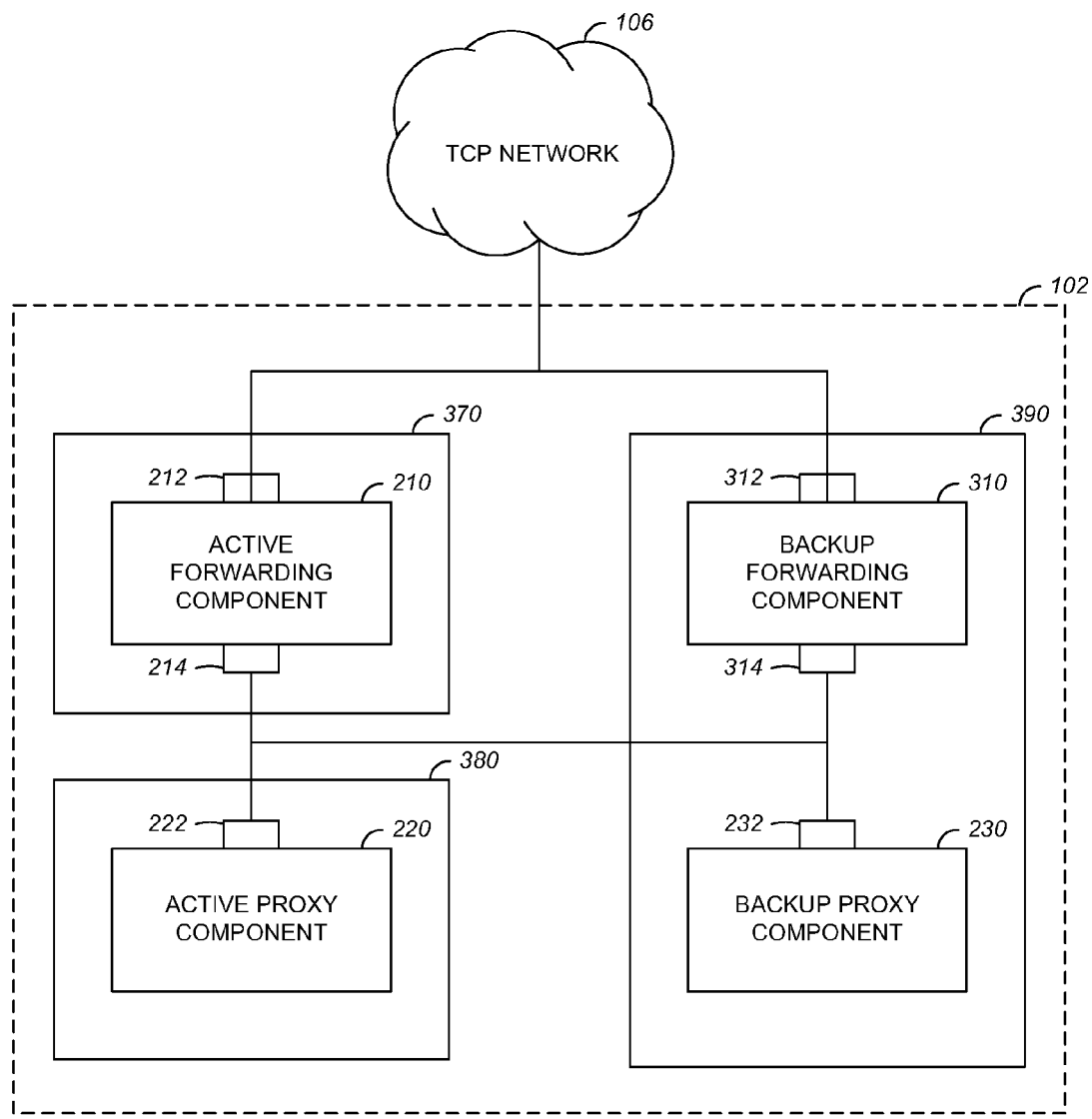
FIG. 3C illustrates an exemplary connection resilient proxy system with an active forwarding component residing on a first physical device, an active proxy component residing on a second physical device, and a backup proxy component and a backup forwarding component residing on a third physical device.

FIG. 3C illustrates an exemplary connection resilient proxy system 102 with the active forwarding component 210 residing on a third physical device 370, the active proxy component 220 residing on a fourth physical device 380, and the backup proxy component 230 and the backup forwarding component 310 residing on a fifth physical device 390. In the normal operation, the active forwarding component 210 routes data packets between the external TCP network 106 and the active proxy component 220. When the fourth physical device 380 fails, the active forwarding component 210 routes data packets to the backup proxy component 230, which resides on the fifth physical device 390, once its connections with the backup proxy component 230 are established. Alternatively, if the third physical device 370 fails, the backup forwarding component 310 takes over the functions of the active forwarding component 210. Therefore, the active proxy component 220 may takeover the functions of the backup proxy component 230 once the fourth physical device 380 recovers from the failure. Similarly, the active forwarding component 210 may takeover the functions of the backup forwarding component 310, once the third physical device 370 recovers from failure. This can be implemented by simulating a failure of at least one of the backup forwarding component 310 and the backup proxy component 230.

Figure 4:
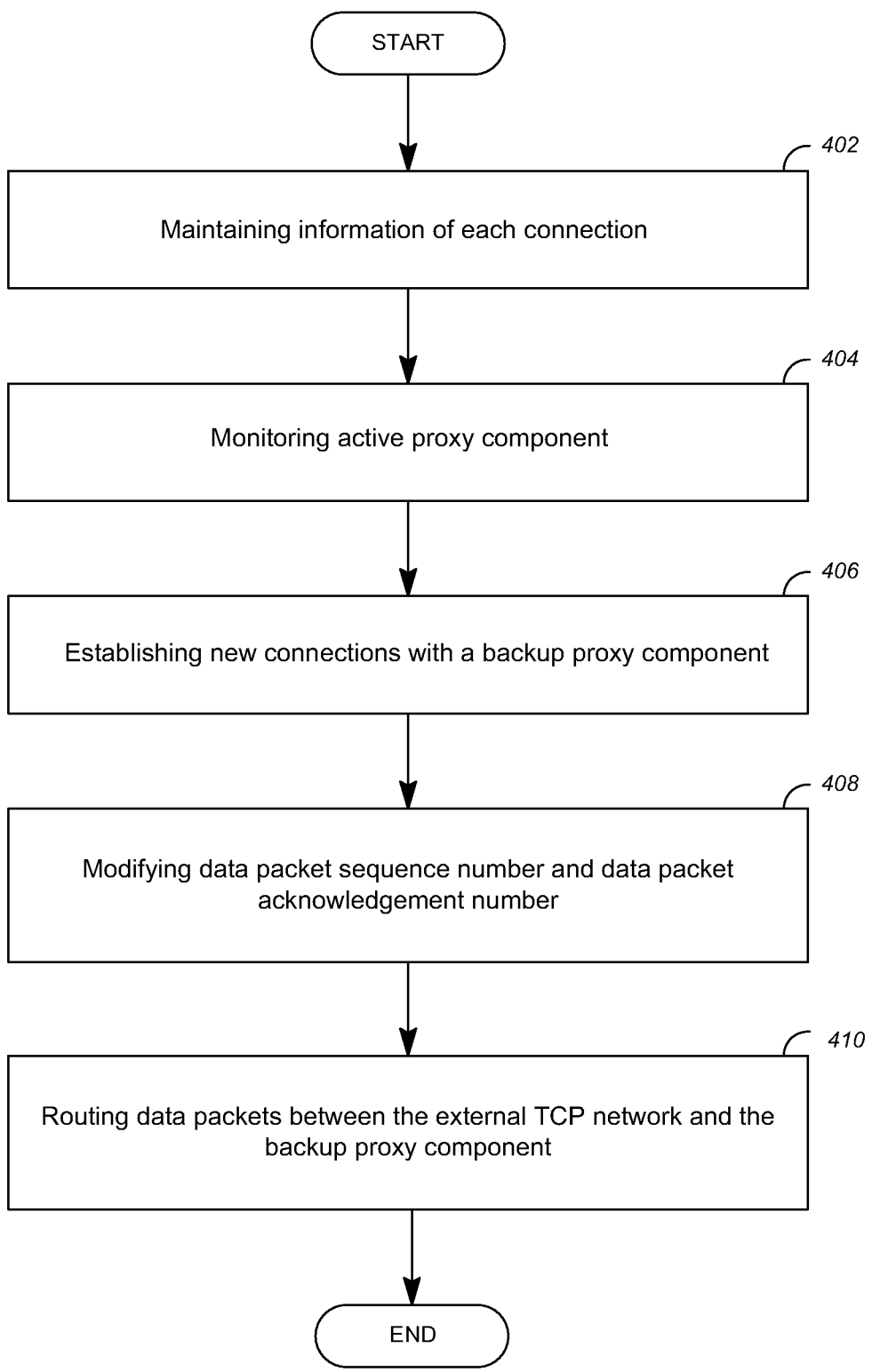
FIG. 4 is a flowchart illustrating an exemplary method of providing connection resiliency.

FIG. 4 is a flowchart illustrating an exemplary method of providing connection resiliency. Data packets are exchanged between the destination and the proxy system 102 via the external TCP network 106. Further, these data packets are internally routed between various components of the proxy system 102 over corresponding internal connections or channels as described in FIGS. 2 and 3A. At step 402, information of each connection of the active forwarding component 210 with at least one of the TCP network 106, the active proxy component 220 and the backup proxy component 230 is maintained. The information comprises at least one of highest data packet sequence number, highest data packet acknowledgement number, a source IP address, a destination IP address, a source port number, a destination port number, a sequence number delta, an acknowledgement number delta, and internal connection information for each connection. If the received data packet sequence number or the data packet acknowledgement number is the highest number received so far on that connection, the maintained information is updated.

At step 404, the active proxy component 220 is monitored. Monitoring includes sending ping messages, TCP packets or any application messages to the active proxy component 220 expecting a response. Alternatively, monitoring may be performed by checking the time, the active proxy component 220 takes to respond to a request. This information may be used to determine the capacity or to detect the failure of the active proxy component 220. The active proxy component may be monitored in order to detect termination of an internal connection between the active forwarding component 210 and the active proxy component 220. This step may be carried out by monitoring the responses received over the internal connection. The internal connection termination may be detected if the response time for a particular internal connection exceeds a predefined limit. The internal connection may be terminated due to a failure of the active proxy component 220 or due to overloading of the active proxy component 220. Upon detection of termination of the internal connection, new connections corresponding to the TCP connections of the TCP network 106 are established with the backup proxy component 230 at step 406. The new internal connection may be established by using the connection information maintained at step 402. The process of establishing a new internal connection involves a TCP handshake and a calculation of sequence and acknowledgement number deltas.

Once the process of establishing the internal connections with the backup proxy component 230 is complete, at step 408, the data packet sequence number and data packet acknowledgement number is modified before the data packets may be routed between the external TCP network 106 and the backup proxy component 230 at step 410. In the scenario data packets coming from the external TCP network 106, the data packet sequence number and the data packet acknowledgement number are modified as follows before they are routed to the backup proxy component:

The data packet sequence number is modified by the sequence number delta while the data packet acknowledgement number is modified by the acknowledgement number delta.

In another scenario data packets coming from the backup proxy component and belonging to the new TCP connection with the backup proxy component, the data packet sequence number and the data packet acknowledgement number are modified as follows before they are routed to the external TCP network 106:

The data packet sequence number is modified by the acknowledgement number delta while the data packet acknowledgement number is modified by the sequence number delta.

The method used to calculate the amount of modification is described in detail with examples below in FIG. 5.

Figure 5A:
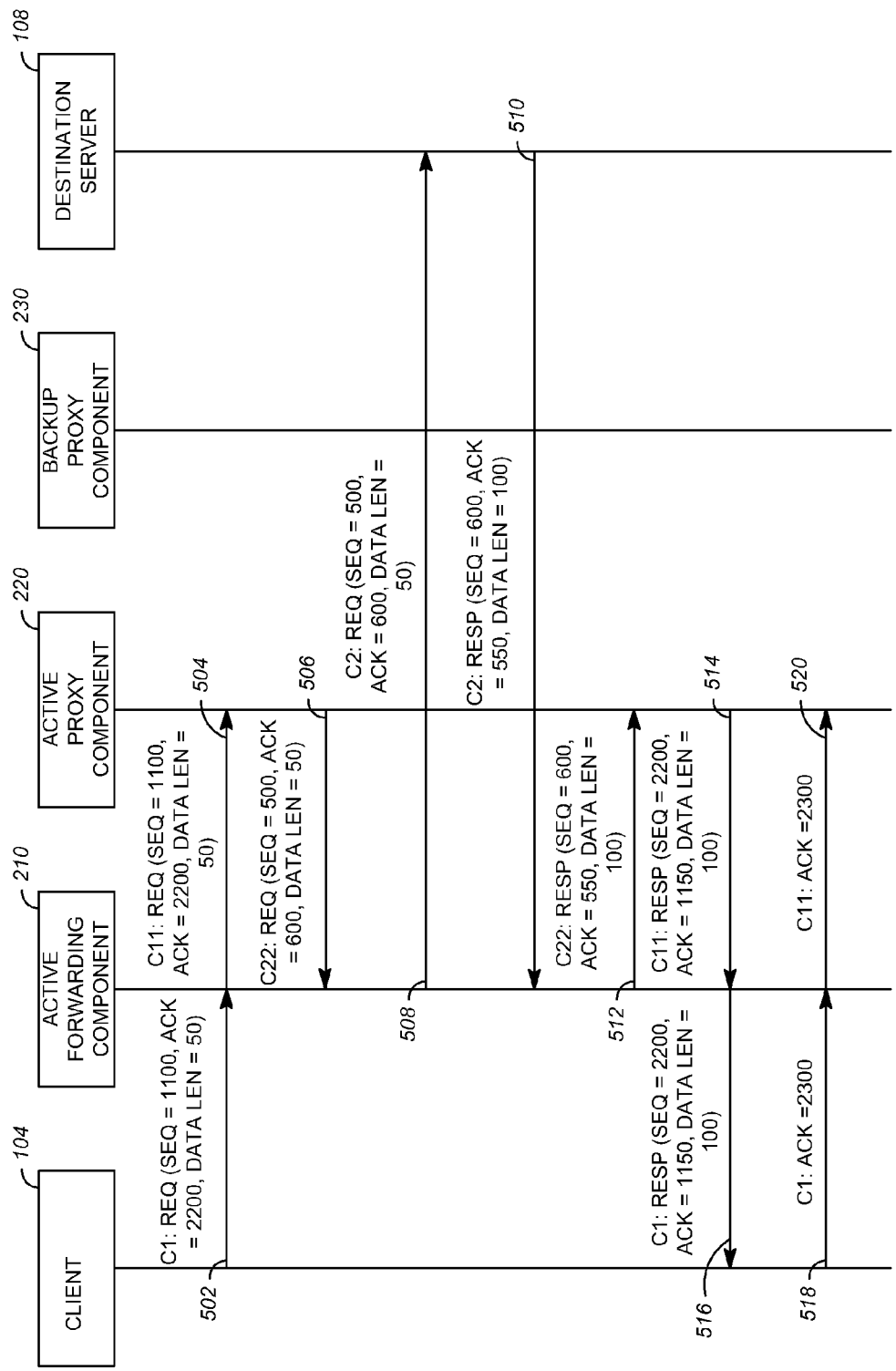
FIG. 5 is an exemplary exchange diagram illustrating exchange of data packets among the client, an active forwarding component, an active proxy component, a backup proxy component, and a server.
Figure 5B:
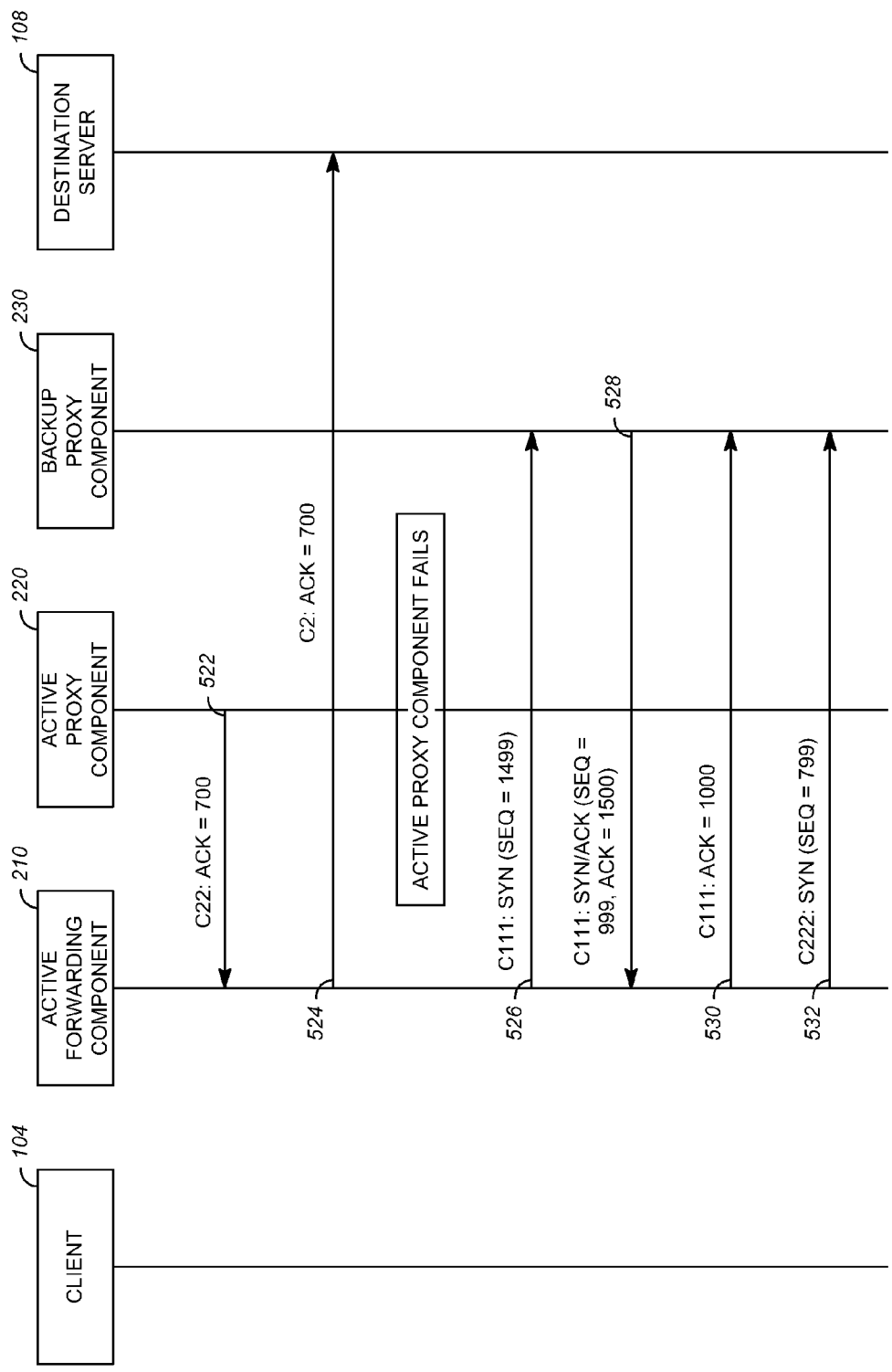
Figure 5C:
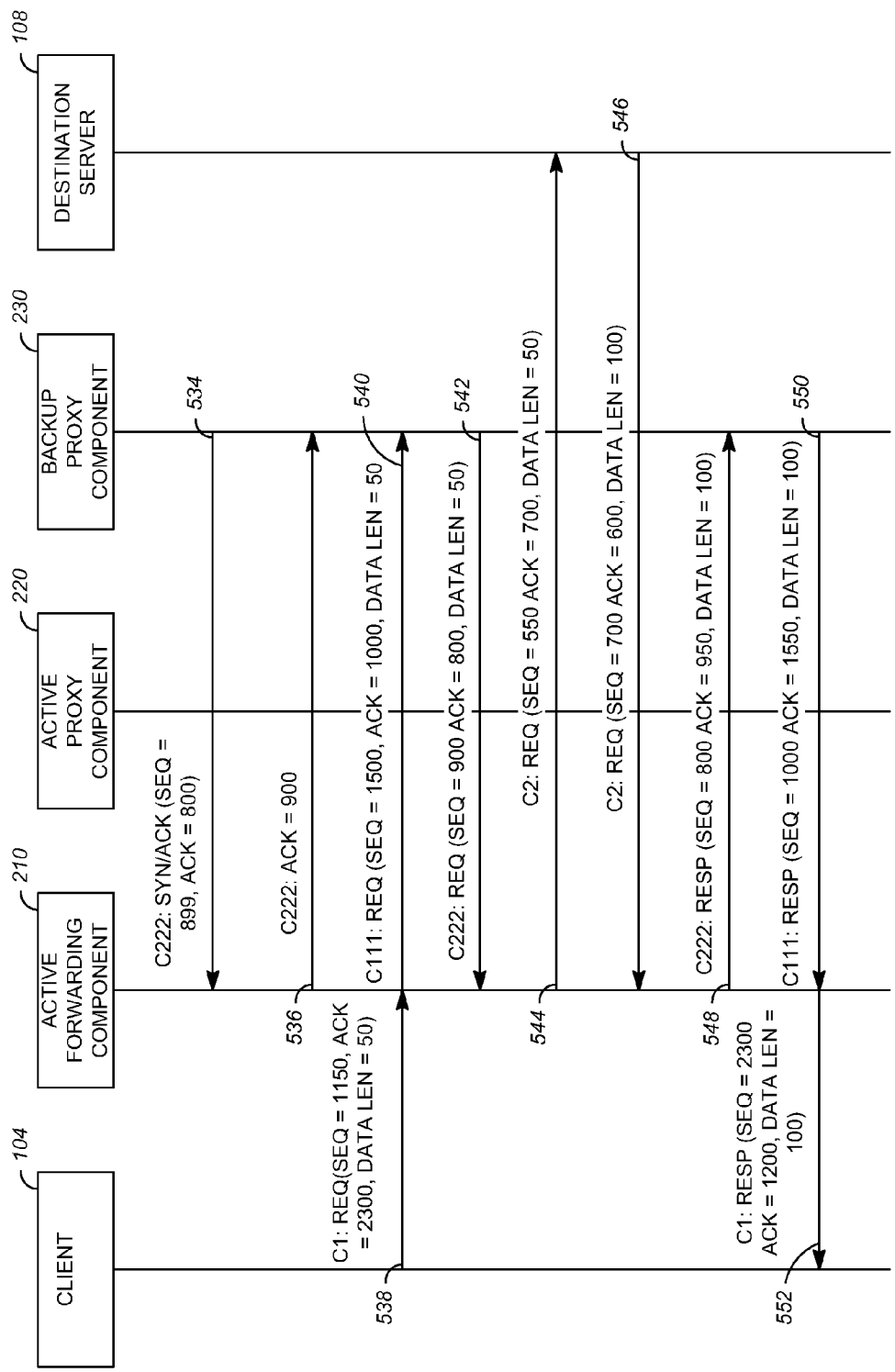

FIGS. 5 (5A, 5B and 5C) is an exemplary exchange diagram 500 illustrating exchange of data packets among the client 104, the active forwarding component 210, the active proxy component 220, the backup proxy component 230, and the server 108. For ease of understanding, exchange of data packets over an internal connection between the active forwarding component 210 and one of the active proxy component 220 or the backup proxy component 230 is explained. Similarly, data packets will be exchanged over numerous such connections that exist between various components and will accordingly be routed to the client 104 or server 108.

At step 502, a request from the client 104 is received by the active forwarding component 210 over a TCP connection C1. The data packet received from the client 104 has a sequence number 1100, an acknowledgement number 2200, and a data packet length 50. The sequence number represents the sequence number of the data packet currently used. The acknowledgement number represents the sequence number of the data packet that is to be received next. The data packet length represents the number of bytes of data sent in the data packet. The active forwarding component assigns the highest data packet sequence number as 1100 and the highest data packet acknowledgement number as 2200.

At step 504, the active forwarding component 210 forwards the data packet to the active proxy component 220 over an internal connection C11 that corresponds to the TCP connection C1 between the client 102 and the active forwarding component 210. The active proxy component 220 performs one or more functions on the data packets as described in FIG. 2. For example, the active proxy component 220 determines that the data packet has to be sent to the server 108. Accordingly, it sends a request to the active forwarding component 210 over an internal connection C22 that corresponds to TCP connection C2 between the active forwarding component 210 and the server 108 at step 506. At step 508, the active forwarding component 210 forwards the request to the server 108 over the TCP connection C2. The active forwarding component assigns the highest data packet sequence number as 600 and the highest data packet acknowledgement number as 500.

At step 510, the active forwarding component 210 receives the response of the server 108 with a data packet having sequence number 600, acknowledgement number 550, and a data packet length 100. The active forwarding component assigns the highest data packet sequence number as 600 and the highest data packet acknowledgement number as 550. The active forwarding component 210 forwards the response to the active proxy component 220 at step 512.

The active proxy component 220 determines that the data packet is to be sent to the client 104. Further, it reassigns a data packet sequence number and a data packet acknowledgement number to the data packet to enable the client to identify the request to which the response is received. The data packet sequence number of the response is assigned the value of the data packet acknowledgement number of the corresponding request received from the client 104, that is, 2200. The data packet acknowledgement number is assigned a value that is sum total of the data packet sequence number and the data packet length of the corresponding request received from the client 104 (step 502), that is, 1150. Accordingly, at step 514, the active proxy component 220 responds over the internal connection C11 with the data packet sequence number 2200 and the data packet acknowledgement number 1150 along with the 100 bytes of data received over C22. The response is forwarded by the active forwarding component 210 to the client 104 over the TCP connection C1 at step 516. The active forwarding component assigns the highest data packet sequence number as 1150 and the highest data packet acknowledgement number as 2200.

Thereafter, the client 104 sends an acknowledgement (data packet acknowledgement number 2300, which is sum total of the data packet sequence number 2200 and the 100 data bytes received) over C1 (step 518). The active forwarding component assigns the highest data packet sequence number as 1150 and the highest data packet acknowledgement number as 2300. The active forwarding component 210 forwards this acknowledgement over the internal connection C11 to the active proxy component 220 (step 520).

At step 522, the active proxy component 220 sends an acknowledgement (data packet acknowledgement number 700) over C22, which is forwarded by the active forwarding component 210 to the server 108 (step 524). As described above, the data packet acknowledgement number is the sum total of the data packet sequence number 600 and the data packet length 100 received from the server 108 (step 510). The active forwarding component assigns the highest data packet sequence number as 700 and the highest data packet acknowledgement number as 550.

Now, the active proxy component 220 fails. As a result, all the connections of the active forwarding component 210 with the active proxy component 220 are terminated. Upon detection of the termination of the internal connections, the active forwarding component 210 establishes new connections with the backup proxy component 230. The active forwarding component 210 exchanges synchronization data packets with the backup proxy component 230 over a new internal connection C111 (step 526, 528, and 530). C111 corresponds to TCP connection C1 between the client 104 and the active forwarding component 210. At step 526, the active proxy component 220 sends a TCP synchronization data packet with a data packet sequence number 1499 to the backup proxy component 230 over the internal connection C111. At step 528, the backup proxy component 230 returns a TCP synchronization acknowledgement data packet to the active proxy component 210 with data packet sequence number 999 and data packet acknowledgement number 1500 (which is the sequence number of the received synchronization data packet (1499) incremented by unity) over the internal connection C111. The active forwarding component 210 then sends a TCP acknowledgement data packet to the backup proxy component 230 (step 530) with data packet acknowledgement number 1000 (which is the sequence number of the received synchronization acknowledgement data packet (999) incremented by unity) over the internal connection C111. This completes the handshaking procedure between the active forwarding component 210 and the backup proxy component 230 over the internal connection C111.

Similarly, the active forwarding component 210 exchanges synchronization data packets with the backup proxy component 230 over a new internal connection C222, that corresponds to the TCP connection C2 between the server 108 and the active forwarding component 210 (step 532, 534, and 536). At step 532, the active proxy component 220 sends a TCP synchronization data packet with data packet sequence number 799 to the backup proxy component 230 over the internal connection C222. At step 534, the backup proxy component 230 returns a TCP synchronization acknowledgement data packet to the active proxy component 210 with data packet sequence number 899 and data packet acknowledgement number 800 (which is the sequence number of the received synchronization data packet (799) incremented by unity since that packet contained one byte of data (as defined by TCP) over the internal connection C222. The active forwarding component 210 then sends a TCP acknowledgment data packet to the backup proxy component 230 (step 536) with data packet acknowledgement number 900 (which is the sequence number of the received synchronization data packet (899) incremented by unity) over the internal connection C222. This completes the handshaking procedure between the active forwarding component 210 and the backup proxy component 230 over the internal connection C222.

While the handshaking is in progress, the data packets received from the client and server are discarded by the active forwarding component. Once handshaking between the active forwarding component 210 and the backup proxy component 230 is complete, data packets from the client 104 or the server 108 are received again by the active forwarding component 210. The active forwarding component 210 receives the data packet over the TCP connection C1 from the client 104 at step 538. The details of the data packet are data packet sequence number 1150 (data packet acknowledgement number of the previous data packet received by the client), data packet acknowledgement number 2300 (sum total of the data packet sequence number 2200 and the data packet length 100 of the previous data packet received by the client), and data packet length 50. The active forwarding component assigns the highest data packet sequence number as 1150 and the highest data packet acknowledgement number as 2300.

At step 540, the active forwarding component 210 forwards the received data packet to the backup proxy component 230 over the internal connection C111. The active forwarding component 210 modifies the data packet sequence number by a front end sequence number delta and the data packet acknowledgement number by a front end acknowledgement number delta of the internal connection C111 before forwarding it to the backup proxy component 230.

The sequence number delta of the internal connection C111 is calculated as the difference between the data packet acknowledgement number received by the active forwarding component 210 from the backup proxy component 230 during C111 establishment (1500 at step 528) and the highest data packet sequence number of connection C1 (1150 at step 518). The active forwarding component 210 may use the information maintained by it for this calculation.

The acknowledgement number delta of the internal connection C111 is calculated as the difference between the data packet acknowledgement number sent to the backup proxy component 230 from the active forwarding component 210 during C111 establishment (1000 at step 530) and the highest data packet acknowledgement number of connection C1 (2300 at step 518).

The sequence number delta (350) and the acknowledgement number delta (−1300) of the internal connection C111 are added to the data packet sequence number (1150) and the data packet acknowledgement number (2300) respectively to generate the new data packet sequence number (1500) and the new data packet acknowledgement number (1000), which are used for the data packet at step 540. Henceforth, for every subsequent data packet forwarded from connection C1 to C111, the sequence number delta and the acknowledgement number delta of the connection C111 are added to the data packet sequence number and data packet acknowledgement number respectively.

At step 542, the backup proxy component 230 proxies the received 50 byte request received from the client to the server and sends a data packet with sequence number 900 (data packet acknowledgement number of the previous data packet received over the internal connection C222 in step 536), acknowledgement number 800 (data packet sequence number of the previous data packet received over the internal connection C222 in step 536), and data packet length 50 to the active forwarding component 210 over C222. At step 544, the active forwarding component 210 forwards the received data packet to the server 108 over TCP connection C2. The active forwarding component 210 modifies the data packet sequence number by a sequence number delta and the data packet acknowledgement number by an acknowledgement number delta of the internal connection C222 before forwarding it to the server 106.

The sequence number delta of the internal connection C222 is calculated as the difference between the data packet acknowledgement number transmitted by the active forwarding component 210 to the backup proxy component 230 during the internal connection C222 establishment (900 at step 536) and the highest data packet acknowledgement number of connection C2 (550 at step 524).

The acknowledgement number delta of the internal connection C222 is calculated as the difference between the data packet acknowledgement number received by the active forwarding component 210 from the backup proxy component 230 during C222 establishment (800 at step 534) and the highest data packet acknowledgement number of C2 (700 at step 524).

The sequence number delta (350) and the acknowledgement number delta (100) of the internal connection C222 are subtracted from the data packet sequence number (900) and the data packet acknowledgement number (800) respectively to generate the new sequence number (550) and the new acknowledgement number (700), which are used for the data packet at step 544. Henceforth, for every subsequent data packet forwarded from C222 to C2, the back end sequence number delta and the back end acknowledgement number delta of the internal connection C222 are subtracted from the data packet sequence number and data packet acknowledgement number respectively. The active forwarding component assigns the highest data packet sequence number as 700 and the highest data packet acknowledgement number as 550.

At step 546, the server 108 sends the data packet with sequence number 700 and acknowledgement number 600 to the active forwarding component 210 over the TCP connection C2. The active forwarding component assigns the highest data packet sequence number as 700 and the highest data packet acknowledgement number as 600.

At step 548, the active forwarding component 210 forwards the received data packet to the backup proxy component 230 over the internal connection C222. The active forwarding component 210 modifies the data packet sequence number by a front end sequence number delta and the data packet acknowledgement number by a front end acknowledgement number delta of the internal connection C222 before forwarding it to the backup proxy component 230. The sequence number delta (100) and the acknowledgement number delta (350) of the internal connection C222 are added to the sequence number (700) and the acknowledgement number (600) respectively to generate the new sequence number (800) and the new acknowledgement number (950), which are used for the data packet at step 548.

At step 550, the backup proxy component 230 sends the data packet with sequence number 1000 and acknowledgement number 1550 to the active forwarding component 210 over the internal connection C111. At step 552, the active forwarding component 210 forwards the received data packet to the client 102 over the TCP connection C1. The active forwarding component 210 modifies the sequence number of the data packet by a back end sequence number delta of the internal connection C111 and the acknowledgement number by a back end acknowledgement number delta of the internal connection C111 before forwarding it to the client 102. The sequence number delta (−1300) and the acknowledgement number delta (350) of C111 are subtracted from the sequence number (1000) and the acknowledgement number (1550) respectively to generate the new sequence number (2300) and the new acknowledgement number (1200), which are used for the data packet at step 552. The active forwarding component assigns the highest data packet sequence number as 1200 and the highest data packet acknowledgement number as 2300.

In an alternative embodiment, instead of using the highest received data packet sequence and acknowledgement numbers over a TCP connection, the active forwarding component may use the sequence and acknowledgement number of the first data packet received from the external TCP network after the failure of the active proxy component to infer the data packet sequence number deltas and acknowledgement number deltas. The sequence number of the first received data packet equals the last highest sent acknowledgement number from the active proxy component 220. Also, the acknowledgement number of the first received data packet can be used instead of the last acknowledgement number sent to the active proxy component 220. In some cases, using the data packet acknowledgement number is more reliable then using the saved highest data packet acknowledgement number since it is more current and may account for a lost packet acknowledgement number sent to the external TCP network. In a yet another embodiment, the lowest sequence number and the lowest acknowledgement number of the data packets that may have been discarded by the active forwarding component during internal TCP handshaking, can be used to infer the sequence number deltas and acknowledgement number deltas instead of using the highest received data packet sequence and acknowledgement numbers over a connection. In yet another alternate embodiment, a combination of both the mechanisms may be employed.

Figure 6:
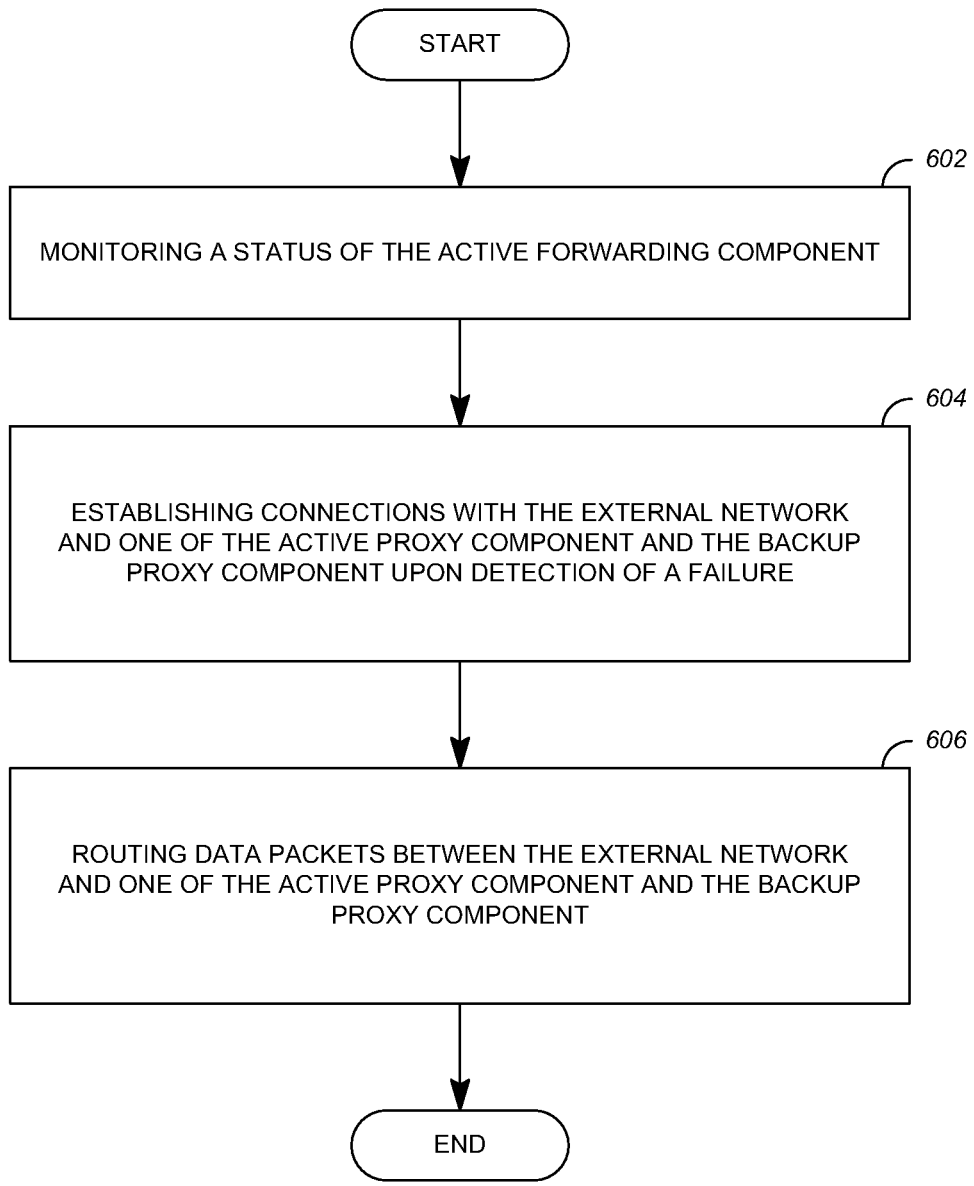
FIG. 6 is a flowchart illustrating the method for providing connection resiliency in an event an active forwarding component fails.

FIG. 6 is a flowchart illustrating the method for providing connection resiliency in an event the active forwarding component 210 fails. In this example, the method works in accordance with the VRRP protocol. At step 602, the status of the active forwarding component 210 is monitored. The status may be monitored as part of the VRRP protocol, for example, VRRP advertisements. Upon detection of a failure of the active forwarding component 210, the backup forwarding component 310 becomes active and starts responding to ARP requests for IP addresses defined on 212 and 312. This takeover is managed by the VRRP and the external TCP network directs the data packets to the backup forwarding component 310. Also, its connections with the active proxy component 220 (or the backup proxy component 230, if the active forwarding component 210 fails) are established. The connections to the backup forwarding component 310 may be established by using the information of the data packets maintained by the active forwarding component 210 that is updated after a fixed time interval. Alternatively, the connections may be established by querying one of the active proxy component 220 and the backup proxy component 230. Thereafter, data packets are routed between the external TCP network 106 and one of the active proxy component 220 and the backup proxy component 230 (step 606). Routing may include modifying a data packet sequence number, a data packet acknowledgement number and destination IP and port. The amount of modification may be calculated by using the information of data packets maintained by one of the active forwarding component 210, the active proxy component 220 and the backup proxy component 230. The information includes at least one of a highest data packet sequence number, a highest data packet acknowledgement number, a data packet length, a source IP address, a destination IP address, a source port number, a destination port number, a sequence number delta, an acknowledgement number delta, and internal connection information.

The foregoing detailed description has set forth a few of the many forms that this invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the present invention are implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A connection resilient proxy system communicating with at least one client and one server through at least one transmission control protocol (TCP) network external to the proxy system, the proxy system comprising:
   at least one active proxy configured to maintain a separate TCP connection with each of the client and the server and determine determining a destination for received data, wherein the destination includes one of the client and the server;

at least one backup proxy, residing on a physical device, configured to determine the destination for received data in an event of predetermined conditions; and at least one active forwarding component configured to route data between the at least one TCP network and the active proxy, the active forwarding component is further configured to maintain information of the TCP connections between the TCP networks and the active proxy, and wherein in the event of a predetermined condition, said active forwarding component is further configured to calculate a sequence number delta and an acknowledgement number delta using said maintained information, to modify a TCP sequence number and a TCP acknowledgement number of a received data packet according to the sequence number delta and the acknowledgement number delta, and to forward the received modified data packet to said backup proxy or said TCP network, thereby forwarding data, to and from both the client and the server, to and from the backup proxy without disconnection of the TCP connections of the client and server, wherein the information of the TCP connections includes at least socket information and TCP sequence information.

2. The system of claim 1, wherein said predetermined conditions include failure or overload of the active proxy, and said system further comprising a backup forwarding component for routing data packets between the TCP network and one of the active proxy and the backup proxy if the active forwarding component fails or is in an overload condition.

3. The system of claim 2 wherein the backup forwarding component is enabled by a virtual router redundancy protocol to take over functions performed by the active forwarding component.

4. The system of claim 1 wherein the active forwarding component performs at least one of network address translation and network address port translation.

5. The system of claim 1 wherein, for each TCP connection, the TCP sequence information includes at least one of highest data sequence number, highest data acknowledgement number, a sequence number delta, an acknowledgement number delta, and wherein the socket information includes at least one of a source IP address, a destination IP address, a TCP source port number, a TCP destination port number.

6. The system of claim 1 wherein the active forwarding component monitors the active proxy for said predetermined conditions.

7. The system of claim 6 wherein the active forwarding component establishes a new TCP connection with the backup proxy for a corresponding TCP connection with the active proxy based on the monitoring of the active proxy.

8. The system of claim 5 wherein the sequence number delta is calculated as a difference between said highest data sequence number and the TCP acknowledgement number received by the active forwarding component from the backup proxy component during TCP connection establishment.

9. The system of claim 5 wherein the acknowledgement number delta is calculated as the difference between said highest data acknowledgement number and the TCP acknowledgement number sent by the active forwarding component to the backup proxy component during TCP connection establishment.

10. The system of claim 1 wherein the active proxy performs at least one of data caching, data filtering, data blocking, data encryption and decryption, data compression and decompression, data authentication, data securing, data formatting, TCP splitting, TCP multiplexing, and data modification.

11. The system of claim 1 wherein the active proxy performs at least one of TCP splitting, and TCP multiplexing.

12. A proxy system communicating with at least one client and one server through one or more transmission control protocol (TCP) networks external to the proxy system, the proxy system comprising:

at least one first proxy component configured to manage a separate TCP connection with each of the client and the server and to determine a destination of received data, wherein the destination includes one of the client and the server;

at least one second proxy configured to determine the destination for a received data packet upon the occurrence of a condition; and at least one forwarding component, residing on a physical device, configured to route data packets between the one or more TCP networks and the first proxy, and to maintain information of the TCP connections between the TCP network and the first proxy, in the event of the occurrence of the condition, the forwarding component is further configured to establish a new TCP connection between the forwarding component and the second proxy for each of the client and the server TCP connections, the TCP connections corresponding to the TCP connections with the first proxy component, the active forwarding component configured to calculate a sequence number delta and an acknowledgement number delta using the maintained information and to modify a data packet TCP sequence number and a data packet TCP acknowledgement number according to the calculated sequence number delta and the acknowledgement number delta while routing the data packets between the one or more TCP networks and the second proxy, thereby forwarding data, to and from both the client and the server, to and from the second proxy without disconnection of the TCP connections of the client and server.

13. The system of claim 12 wherein the predetermined condition includes failure or an overload condition of the first proxy, and wherein the first proxy performs at least one of data caching, data filtering, data blocking, data encryption and decryption, data compression and decompression, data authentication, data securing, data formatting, TCP splitting, TCP multiplexing, and data modification.

14. A method that provides connection resiliency, the method comprising:

maintaining, by a first proxy residing on a physical device, a TCP connection with a TCP client and a TCP connection with a TCP server through one or more TCP networks;

maintaining information of both TCP connections by a forwarding component between the TCP networks and the first proxy, wherein the maintained information includes at least socket information and TCP sequence information;

monitoring the first proxy;

based upon the monitoring, establishing, by the forwarding component, a new TCP connection with a second proxy that resides on the physical device for each of the TCP connections maintained by the first proxy; and forwarding data packets, to and from both the client and the server, to and from the second proxy without disconnection of the TCP connections of the TCP client and TCP server.

15. The method of claim 14 further comprising:
calculating, prior to forwarding, a sequence number delta and an acknowledgement number delta using the maintained information; and
modifying, prior to forwarding, a sequence number and acknowledgement number of each data packet based upon the sequence number delta and the acknowledgement number delta.

16. The method of claim 14, wherein TCP sequence information comprises at least one of: a highest sequence number, a highest acknowledgement number, a sequence number delta, an acknowledgement number delta, wherein the socket information includes at least one of: a source IP address, a destination IP address, a TCP source port number, a TCP destination port number.

17. The method of claim 16, wherein said sequence number delta is calculated as a difference between said highest data sequence number and the data packet acknowledgement number received by the active forwarding component from the backup proxy component during said new TCP connection establishment.

18. The method of claim 14 further comprising backing up the forwarding component by a backup forwarding component using virtual router redundancy protocol.

19. The method of claim 14 further comprising mirroring the maintained information on a backup forwarding component.

20. The method of claim 14 further comprising querying one of the first proxy and the second proxy to determine the connection information when the backup forwarding component takes over.

21. The method of claim 14 further comprising reestablishing the connections with the first proxy, based upon the monitoring of the first proxy.

22. The method of claim 14 further comprising switching back to the forwarding component, once the active forwarding component is functional.

23. A proxy system comprising:
an active forwarding component, residing on a physical device, in communication with external transmission control protocol (TCP) networks, wherein the active forwarding component resides on a first network proxy server, wherein the active forwarding component is configured to maintain information of the TCP connections flowing through the active forwarding component between a TCP network and one of the active proxy and the backup proxy;
at least one active proxy in communication with the active forwarding component, wherein the active proxy resides on a second network proxy server, wherein the second network proxy server is separate from the first network proxy server;
a backup forwarding component in communication with the external transmission control protocol network if the active forwarding component fails, wherein the backup forwarding component resides on the second network proxy server; and
at least one backup proxy in communication with one of the active forwarding component and the backup forwarding component, wherein the backup proxy resides on the first network proxy server.

24. The system of claim 23, wherein the active forwarding component establishes a new TCP connection with the backup proxy that is residing on a physical device for each of the TCP connections maintained by the active proxy, and forwarding data, to and from both the client and the server, to and from the backup proxy without disconnection of the TCP connections of the client and server.

25. A forwarding device routing data packets between transmission control protocol (TCP) networks and a first proxy, comprising:
a processing unit integrated into a physical device, the processing unit is configured to maintain information of TCP connections between the TCP networks and the first proxy, and in the event of a predetermined condition, calculate a sequence number delta and an acknowledgement number delta using said maintained information, modify a TCP sequence number and a TCP acknowledgement number of a received data packet according to the sequence number delta and the acknowledgement number delta and forwarding the received modified data packet to a second proxy or said TCP network, thereby forwarding data, to and from both a client and a server, to and from the second proxy without disconnection of TCP connections of the client and server maintained by the first proxy prior to said predetermined condition event, wherein the information of TCP connections includes at least socket information and TCP sequence information.

26. The forwarding device of claim 25, wherein the processing unit establishes a new TCP connection with the second proxy for each of the TCP connections maintained by the first proxy.

* * * * *